United States Patent
Ogawa et al.

(10) Patent No.: US 11,951,874 B2
(45) Date of Patent: Apr. 9, 2024

(54) VEHICLE DRIVING SYSTEM

(71) Applicant: Mazda Motor Corporation, Hiroshima (JP)

(72) Inventors: Daisaku Ogawa, Aki-gun (JP); Daisuke Umetsu, Aki-gun (JP); Shinya Morishita, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 310 days.

(21) Appl. No.: 17/356,137

(22) Filed: Jun. 23, 2021

(65) Prior Publication Data
US 2022/0001749 A1    Jan. 6, 2022

(30) Foreign Application Priority Data
Jul. 1, 2020   (JP) ................................. 2020-113868

(51) Int. Cl.
*B60L 7/26* (2006.01)
*B60L 15/20* (2006.01)

(52) U.S. Cl.
CPC .............. *B60L 7/26* (2013.01); *B60L 15/2009* (2013.01); *B60L 2240/24* (2013.01); *B60L 2240/423* (2013.01); *B60L 2250/26* (2013.01)

(58) Field of Classification Search
None
See application file for complete search history.

(56) References Cited

U.S. PATENT DOCUMENTS

| 2009/0222156 A1* | 9/2009 | Krueger | ............... B60W 20/13 701/22 |
| 2017/0015204 A1* | 1/2017 | Oguri | .................. B60W 30/182 |
| 2017/0021731 A1* | 1/2017 | Suzuki | .................. B60T 8/1755 |

FOREIGN PATENT DOCUMENTS

JP           2014166014 A      9/2014

* cited by examiner

*Primary Examiner* — Todd Melton
*Assistant Examiner* — Jason R Roberson
(74) *Attorney, Agent, or Firm* — Alleman Hall & Tuttle LLP (57) ABSTRACT

A vehicle driving system that can suppress a difference in effect of vehicle attitude control between the cases where a friction braking force is applied and not applied, is provided. The system includes a rotating electric machine, a battery, a steering apparatus, a steering angle sensor, a brake actuator that applies a friction braking force, a friction braking force sensor, and a controller that sets a deceleration torque based on a steering speed detected by the steering angle sensor and controls the rotating electric machine to apply the deceleration torque to a front wheel of the vehicle, thereby executing a vehicle attitude control. When the friction braking force is applied to the wheels by the brake actuator during the vehicle attitude control, if the friction braking force is large, the controller corrects the deceleration torque to a larger value than when the friction braking force is small.

10 Claims, 7 Drawing Sheets

VEHICLE DRIVING SYSTEM

TECHNICAL FIELD

The present invention relates to a vehicle driving system and, in particular, relates to a vehicle driving system having a vehicle attitude control function.

BACKGROUND ART

A vehicle behavior control apparatus is described in JP2014-166014A. In this vehicle behavior control apparatus, yaw acceleration generated in association with steering of a vehicle is calculated by a yaw acceleration calculation unit, and according to this yaw acceleration, a driving force of the vehicle is reduced by a driving force controller. Furthermore, as the yaw acceleration increases, the driving force controller controls the vehicle such that an amount of reduction of the driving force of the vehicle is increased and an increase rate of this increase amount is reduced. Thus, a behavior of the vehicle during cornering is controlled such that the driver's operation becomes natural and stable.

Furthermore, the vehicle behavior control apparatus described in JP2014-166014A is used for an electric automobile that is a vehicle driven by a motor and, when controlling a behavior of the vehicle, causes the motor to generate regenerative torque, thereby reducing the driving force of the vehicle. The driving force is thus reduced by the regenerative torque of the motor, so that the driving force of the vehicle can be reduced with a high responsiveness and the energy efficiency can be enhanced.

SUMMARY OF INVENTION

Problems to be Solved by the Invention

However, there is a problem in that, as in the vehicle behavior control apparatus described in JP2014-166014A, in the case where the driving force is reduced by the regenerative torque of the motor, if a battery connected to the motor is in a nearly fully charged state, a sufficient regenerative torque cannot be generated. That is, when the battery is nearly fully charged, a current generated by regeneration cannot be absorbed by the battery, and the regenerative torque cannot be generated. Accordingly, in the situation where the battery cannot collect the current generated by regeneration, the vehicle behavior control apparatus described in JP2014-166014A cannot execute a vehicle behavior control.

In this way, reducing the driving force with the regenerative torque of the motor and executing the vehicle behavior control (vehicle attitude control) is advantageous in terms of energy efficiency; however, there is a problem in that, depending on a state of the battery, the regenerative torque cannot be generated. Accordingly, in the case where, in addition to the vehicle attitude control, it is necessary to give deceleration to the vehicle, it is considerable to use, in addition to the regenerative torque of the motor, a friction braking force from a friction brake. By thus using the friction braking force together with the regenerative torque of the motor, a sufficient braking force can be obtained when necessary.

However, a new problem has been found in which during execution of the vehicle attitude control, when the friction braking force from the friction brake is applied in addition to the braking force from the regenerative torque generated by the motor, even if the braking force exerted on the vehicle is the same, the effect of the vehicle attitude control becomes different. That is, there is a problem in that the effect of the vehicle attitude control differs between the case where the braking force applied during execution of the vehicle attitude control is only the regenerative torque of the motor and the case where the friction braking force is used together therewith, and thus the driver may feel uncomfortable.

Accordingly, an object of the present invention is to provide a vehicle driving system that can suppress a difference in effect of vehicle attitude control between the cases where, during execution of the vehicle attitude control, a friction braking force is applied and is not applied, thereby preventing a driver from feeling uncomfortable.

Means for Solving the Problems

To solve the above-described problems, disclosed herein is a vehicle driving system having a vehicle attitude control function, the vehicle driving system including a rotating electric machine that drives a front wheel of the vehicle or applies a regenerative torque to the front wheel; a battery that supplies electric power to the rotating electric machine and stores electric power regenerated by the rotating electric machine; a steering apparatus for steering the vehicle; a steering angle sensor for detecting a steering angle achieved by the steering apparatus; a brake actuator that applies a friction braking force to each of wheels of the vehicle; a friction braking force sensor that detects the friction braking force produced by the brake actuator; and a controller that sets a deceleration torque based on a steering speed detected by the steering angle sensor and controls the rotating electric machine such that the deceleration torque is applied to the front wheel of the vehicle, thereby executing vehicle attitude control. When the friction braking force is applied to each of the wheels by the brake actuator during execution of the vehicle attitude control, the controller corrects the deceleration torque to a larger value when the friction braking force detected by the friction braking force sensor is large than when the friction braking force is small.

In the above configuration, the rotating electric machine drives the front wheel of the vehicle with the electric power supplied from the battery, and the electric power regenerated by applying the regenerative torque to the front wheel is stored in the battery. Furthermore, the vehicle is steered by the steering apparatus, and this steering angle is detected by the steering angle sensor. Furthermore, the friction braking force is applied to each of the wheels of the vehicle by the brake actuator, and this friction braking force is detected by the friction braking force sensor. The controller sets the deceleration torque based on the steering speed and executes the vehicle attitude control in which the deceleration torque is applied to the front wheel of the vehicle by the rotating electric machine. Furthermore, when the friction braking force is applied to each of the wheels during execution of the vehicle attitude control, if the friction braking force is large, the controller corrects the deceleration torque to a larger value than when the friction braking force is small.

In vehicle attitude control, during turn traveling, the vehicle is inclined forward by giving a slight deceleration torque to the wheels and applying a braking force to the vehicle, thereby increasing a vertical load on the front wheel. Increasing the vertical load on the front wheel increases cornering power of the front wheel, and thus the turn-in ability of the vehicle is enhanced, so that the vehicle responsiveness with respect to steering is enhanced. However, the inventor of the present invention has found that the influence on the cornering power of the front wheel differs between the case where a braking force is given to the vehicle by applying regenerative torque to the front wheel and the case where a friction braking force is applied to each of the wheels by the brake actuator, and thus the effect of the vehicle attitude control differs. Accordingly, when the friction braking force is applied to each of the wheels by the brake actuator during execution of the vehicle attitude control, if the friction braking force detected by the friction braking force sensor is large, the deceleration torque is corrected to a larger value than when this friction braking force is small. Thus, it is possible to suppress an occurrence of a difference in effect of the vehicle attitude control depending on the degree to which the friction braking force is given, so that the driver can be prevented from feeling uncomfortable.

In the above configuration, preferably, during non-execution of the vehicle attitude control, the controller executes electric power regeneration via the rotating electric machine within a range of a predetermined regeneration amount less than an upper limit value of a regeneration amount which can be received by the battery.

According to the above, when the vehicle attitude control is not executed, the electric power regeneration is executed within the range of the regeneration amount less than the upper limit value of the regeneration amount which can be received by the battery. Accordingly, at the time of execution of the vehicle attitude control, there is always capacity for performing the electric power regeneration in the battery, and thus the torque generated by the regeneration can be effectively used as the deceleration torque in the vehicle attitude control.

In the above configuration, preferably, during execution of the vehicle attitude control, when a necessary braking force is not obtained only by the regenerative torque from the rotating electric machine, the controller activates the brake actuator to apply the friction braking force to the vehicle.

According to the above, when a necessary braking force is not obtained only by the regenerative torque, the controller activates the brake actuator to apply the friction braking force to the vehicle. Accordingly, even when the regenerative torque is not obtained sufficiently, the necessary braking force can be obtained reliably.

In the above configuration, preferably, when a depression amount of an accelerator pedal of the vehicle is equal to or less than a predetermined amount, the controller is configured to apply a braking force to the vehicle, and when a necessary braking force is not obtained only by the electric power regeneration, even when a brake pedal of the vehicle is not operated, the controller activates the brake actuator to apply the friction braking force to the vehicle.

According to the above, when the depression amount of the accelerator pedal is equal to or less than the predetermined amount, even if the brake pedal of the vehicle is not operated, the controller applies the braking force to the vehicle. Thus, a braking force similar to an engine brake in an engine vehicle can be applied to the vehicle driven by the rotating electric machine. Furthermore, when a necessary braking force is not obtained only by the electric power regeneration, even if the brake pedal is not operated, the controller activates the brake actuator to apply the friction braking force to the vehicle, so that even when the regenerative torque is insufficient, the necessary braking force can be obtained reliably.

In the above configuration, preferably, when a brake pedal of the vehicle is operated during execution of the vehicle attitude control, the controller activates the brake actuator to apply the friction braking force to each of the wheels, and when an operation amount of the brake pedal is large, the controller causes the rotating electric machine to generate a larger regenerative torque than when the operation amount is small.

According to the present invention configured as above, when the brake pedal is operated during execution of the vehicle attitude control, the friction braking force is applied to each of the wheels, and when the operation amount of the brake pedal is large, a large regenerative torque is generated by the rotating electric machine. Accordingly, when a large friction braking force is applied to each of the wheels during the vehicle attitude control, the regenerative torque to be applied to the front wheel is also made larger, so that even in the situation where the large friction braking force is applied, a sufficient effect of the vehicle attitude control can be obtained.

Advantageous Effect of Invention

According to the vehicle driving system of the present disclosure, it is possible to suppress a difference in effect of the vehicle attitude control between the cases where during execution of the vehicle attitude control, the friction braking force is applied and not applied, thereby preventing a driver from feeling uncomfortable.

MODE FOR CARRYING OUT THE INVENTION

Hereinafter, a vehicle driving system according to an embodiment of the present invention will be described with reference to the attached drawings.

Figure 1:
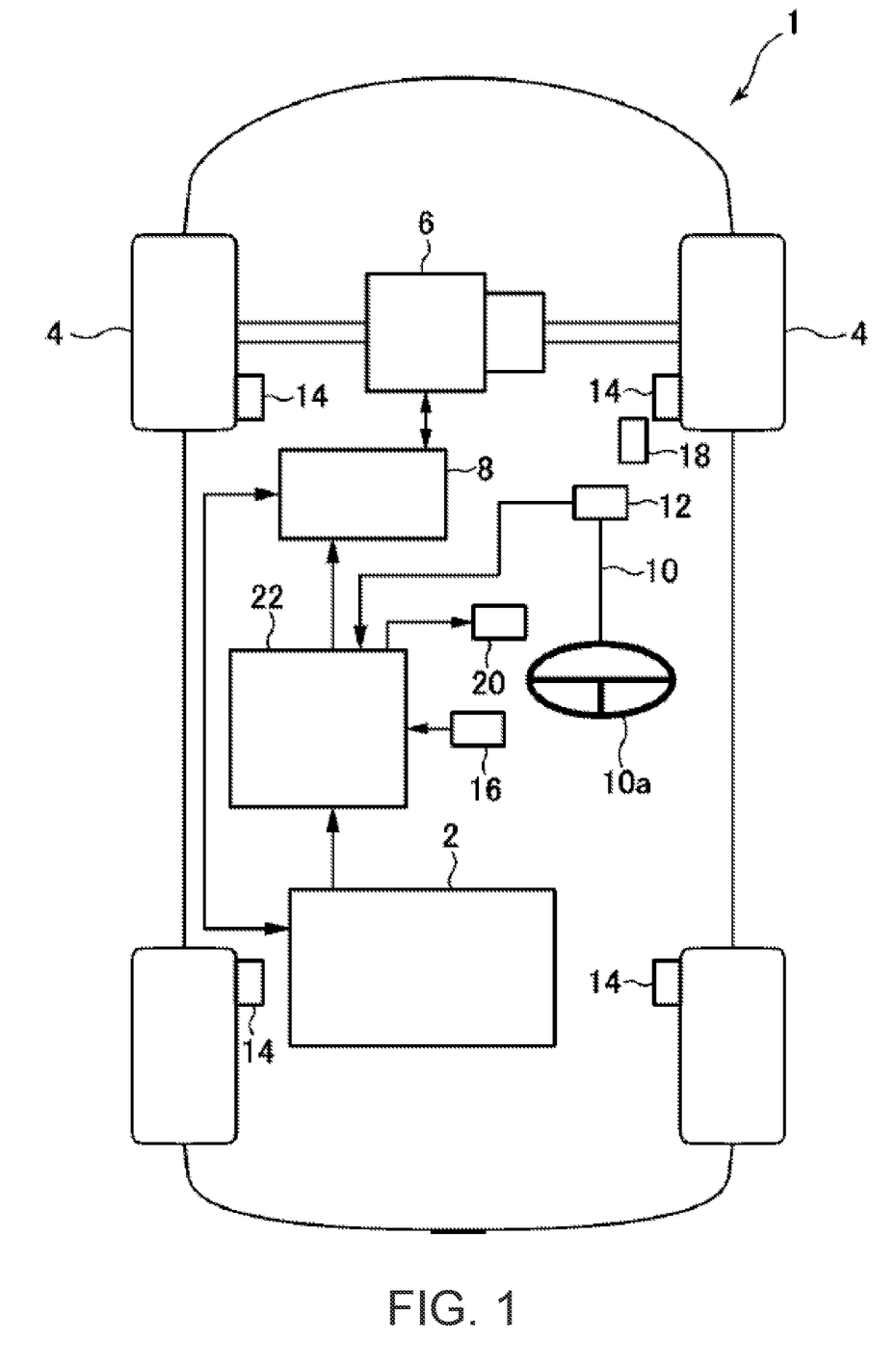
FIG. 1 is a block diagram illustrating an overall configuration of a vehicle equipped with a vehicle driving system according to an embodiment of the present invention.

First, a vehicle equipped with the vehicle driving system according to the embodiment of the present invention will be described with reference to FIG. 1. FIG. 1 is a block diagram illustrating an overall configuration of the vehicle equipped with the vehicle driving system according to the embodiment of the present invention.

As illustrated in FIG. 1, a vehicle 1 equipped with the vehicle driving system according to the present embodiment is an electric automobile equipped with a battery 2 (secondary battery) as a power source. A vehicle body front portion of the vehicle 1 is equipped with a rotating electric machine 6 serving as a motor/generator that drives drive wheels 4 (left and right front wheels in the example of FIG. 1). Furthermore, an inverter 8 is disposed in the vicinity of the rotating electric machine 6, and the inverter 8 converts DC power supplied from the battery 2 into AC power to supply it to the rotating electric machine 6 and converts regenerative electric power generated by the rotating electric machine 6 into AC power to supply it to the battery 2, thereby charging the battery 2.

Furthermore, the vehicle 1 has a steering apparatus 10 for steering the drive wheels 4 serving as steered wheels (front wheels), a steering wheel 10a for operating the steering apparatus 10, and a steering angle sensor 12 that detects a rotational angle of the steering wheel 10a. Furthermore, the vehicle 1 has brake actuators 14 that are supplied with hydraulic pressure based on an operation of a brake pedal (not illustrated) and apply, with this hydraulic pressure, a friction braking force to each of wheels (left and right front wheels and left and right rear wheels) of the vehicle 1. The hydraulic pressure supplied to the brake actuators 14 is detected by a brake fluid pressure sensor 16 serving as a friction braking force sensor. Furthermore, the vehicle 1 has an accelerator opening sensor 18 that detects a depression amount of an accelerator pedal (not illustrated), and a vehicle speed sensor 20 that detects a vehicle speed of the vehicle 1.

The steering angle sensor 12, the brake fluid pressure sensor 16, the accelerator opening sensor 18, and the vehicle speed sensor 20 output respective detection values to a power-train control module (PCM) 22 serving as a controller. Furthermore, the rotating electric machine 6, the battery 2, the steering apparatus 10, the steering angle sensor 12, the brake actuators 14, the brake fluid pressure sensor 16, and the PCM 22 constitute the vehicle driving system according to the embodiment of the present invention.

Figure 2:
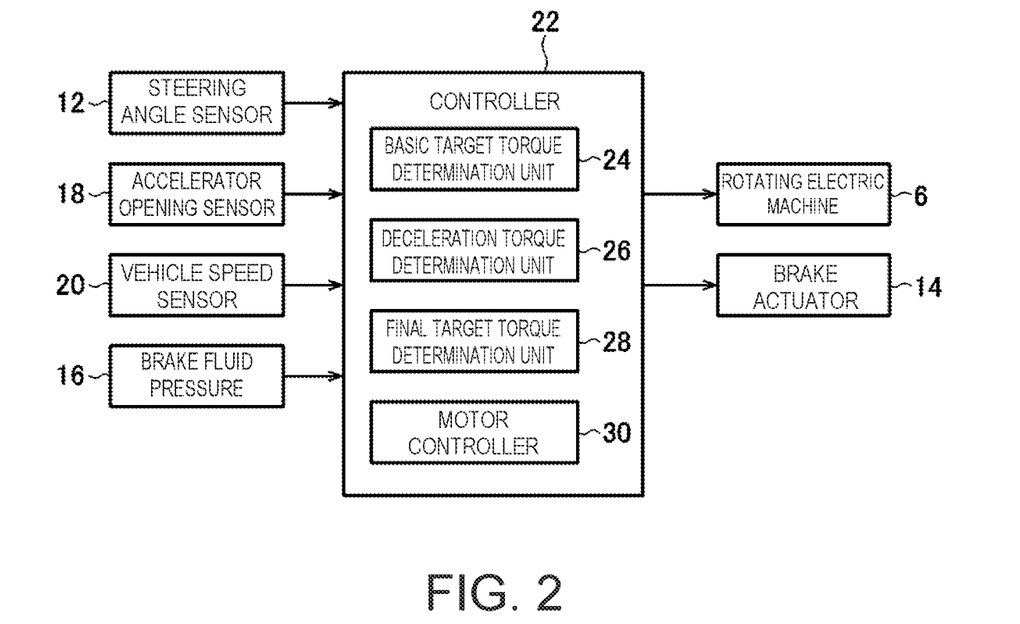
FIG. 2 is a block diagram illustrating an electrical configuration of the vehicle driving system according to the embodiment of the present invention.

Next, an electrical configuration of the vehicle driving system according to the embodiment of the present invention will be described with reference to FIG. 2. FIG. 2 is a block diagram illustrating the electrical configuration of the vehicle driving system according to the embodiment of the present invention. In the present embodiment, the PCM 22 outputs control signals to perform control with respect to the rotating electric machine 6 based on, in addition to detection signals of the steering angle sensor 12, the brake fluid pressure sensor 16, the accelerator opening sensor 18, and the vehicle speed sensor 20 described above, detection signals output by various sensors that detect an operational state of the rotating electric machine 6. That is, when the accelerator pedal (not illustrated) is operated, a driving force is given to the drive wheels 4 by the rotating electric machine 6 controlled by the PCM 22, and thereby the vehicle 1 travels.

On the other hand, when the brake pedal (not illustrated) is operated, the PCM 22 controls the rotating electric machine 6 and the brake actuators 14 to apply a braking force to the vehicle 1. That is, the PCM 22 outputs a control signal to the inverter 8 to cause the rotating electric machine 6 to act as an electric generator and cause the rotating electric machine 6 to generate regenerative torque. This regenerative torque is applied to the drive wheels 4, so that the braking force can be given to the vehicle 1.

Furthermore, the PCM 22 outputs a control signal to a hydraulic pump (not illustrated) to apply hydraulic pressure to each of the brake actuators 14. When the hydraulic pressure is supplied to the brake actuators 14, a friction braking force is applied to the front wheels and the rear wheels via brake pads (not illustrated), so that the braking force can be given to the vehicle 1. The hydraulic pressure supplied to each of the brake actuators 14 is detected by the brake fluid pressure sensor 16, and the friction braking force produced by the brake actuators 14 can be detected based on the detection signal of the brake fluid pressure sensor 16. The PCM 22 uses both the regenerative torque from the rotating electric machine 6 and the friction braking force from the brake actuators 14 to give the braking force to the vehicle 1.

However, the regenerative torque from the rotating electric machine 6 may not be sufficiently generated depending on a state of charge (SOC) of the battery 2. That is, when the battery 2 is in a nearly fully charged state, a current generated by regeneration of the rotating electric machine 6 cannot be collected in the battery 2, and a sufficient regenerative torque cannot be generated.

Figure 3:
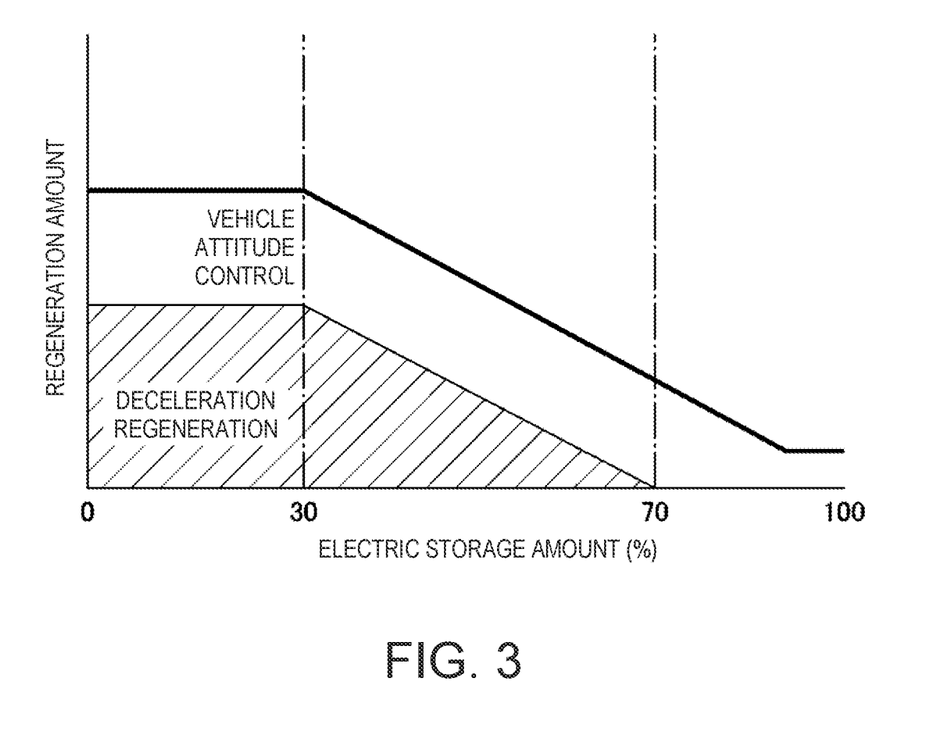
FIG. 3 is a graph illustrating a relationship between an electric storage amount of a battery and an upper limit value of a regeneration amount, in the vehicle driving system according to the embodiment of the present invention.

FIG. 3 is a graph illustrating a relationship between an electric storage amount of the battery 2 and an upper limit value of a regeneration amount which can be received by the battery 2. In FIG. 3, the horizontal axis indicates the electric storage amount of the battery 2, and the vertical axis indicates the upper limit value of electric power (regeneration amount) which can be regenerated in the battery 2. The electric storage amount in the horizontal axis takes a value between 0% and 100% (fully charged). As illustrated in FIG. 3, in the region where the electric storage amount of the battery 2 is about 0 to 30%, the upper limit value of the regeneration amount becomes a substantially constant value. Furthermore, in the region where the electric storage amount of the battery 2 exceeds about 30%, the upper limit value of the regeneration amount decreases linearly with the increase in the electric storage amount, and when the electric storage amount is 100%, the regeneration amount becomes substantially zero.

That is, when electric power regenerated by the rotating electric machine 6 through braking is equal to or less than the upper limit value of the regeneration amount illustrated in FIG. 3, the rotating electric machine 6 can generate, as a braking force, regenerative torque corresponding to the electric power generated by the regeneration. Furthermore, when electric power generated by regeneration of the rotating electric machine 6 exceeds the upper limit value of the regeneration amount, all of the necessary braking force cannot be covered by the regenerative torque, and a part or all of the necessary braking force is complemented by the friction braking force generated by the brake actuators 14. Accordingly, as illustrated in FIG. 3, in the region where the electric storage amount exceeds about 30%, the regenerative torque which can be generated with the increase in the electric storage amount decreases, and in the region where the charging is nearly full, little regenerative torque can be generated.

Furthermore, when the brake pedal (not illustrated) is depressed, and when the depression amount of the accelerator pedal (not illustrated) detected by the accelerator opening sensor 18 is equal to or less than a predetermined value, the PCM 22 gives a braking force to the vehicle 1. Furthermore, at the time of execution of vehicle attitude control described later, the PCM 22 is configured to automatically give a braking force to the vehicle 1 regardless of the operation of the brake pedal or the accelerator pedal.

Here, when a braking force is generated based on the operation of the brake pedal or the accelerator pedal, regenerative torque less than regenerative torque corresponding to the upper limit value of the regeneration amount is set to the upper limit value. That is, as illustrated in FIG. 3, regenerative torque to be produced based on the operation of the brake pedal or the accelerator pedal is restricted to regenerative torque corresponding to the upper edge of the region of deceleration regeneration which is lower than the upper limit value of the regeneration amount, and a braking force exceeding this is complemented by the friction braking force. As illustrated in FIG. 3, the upper limit of the deceleration regeneration, in the region where the electric storage amount of the battery 2 exceeds about 30%, decreases linearly with the increase in the electric storage amount and, in the electric storage amount of about 70%, becomes zero. That is, in the present embodiment, when the electric storage amount of the battery 2 is equal to or greater than about 70% which is less than the maximum electric storage amount, the PCM 22 does not execute electric power regeneration by means of the rotating electric machine 6 based on the operation of the brake pedal or the accelerator pedal.

Thus, the regenerative torque to be produced based on the operation of the brake pedal or the accelerator pedal is always made smaller than the regenerative torque corresponding to the upper limit value of the regeneration amount, and the regeneration amount in the region between the upper limit value of the regeneration amount and the deceleration regeneration is used for producing regenerative torque at the time of execution of the vehicle attitude control described later. Accordingly, in the region where the electric storage amount of the battery 2 is about 0% to about 70%, a predetermined amount of regenerative torque can be always produced for executing the vehicle attitude control, and substantially all of deceleration necessary for the vehicle attitude control can be covered by this regenerative torque.

Furthermore, detection signals from the steering angle sensor 12, the accelerator opening sensor 18, and the vehicle speed sensor 20 are input to the PCM 22, and the PCM 22 executes the vehicle attitude control based on these detection signals.

As illustrated in FIG. 2, the PCM 22 has a basic target torque determination unit 24, a deceleration torque determination unit 26, a final target torque determination unit 28, and a motor controller 30.

The basic target torque determination unit 24 is configured to set target acceleration based on an operational state of the vehicle 1 including an operation of the accelerator pedal (not illustrated) and determine basic target torque corresponding to this.

In the vehicle attitude control, the deceleration torque determination unit 26 is configured to determine deceleration torque for adding deceleration to the vehicle 1 based on a yaw rate-related amount or the like such as a steering speed of the vehicle 1. In the present embodiment, the deceleration torque determination unit 26 uses a steering speed of the vehicle 1 as the yaw rate-related amount.

The final target torque determination unit 28 is configured to determine final target torque based on the basic target torque and the deceleration torque.

The motor controller 30 is configured to output a control signal to the rotating electric machine 6 such that the final target torque is output.

Each of these components of the PCM 22 is executed by a microcomputer including a processor (i.e., a central processing unit (CPU)), various programs which are interpreted and executed on the processor (including a basic control program such as an operating system (OS) and an application program which is initiated on the OS to implement a specific function), and internal memory such as ROM or RAM for storing the programs and various data.

Next, processing that the vehicle driving system performs will be described with reference to FIGS. 4 to 9.

Figure 4:
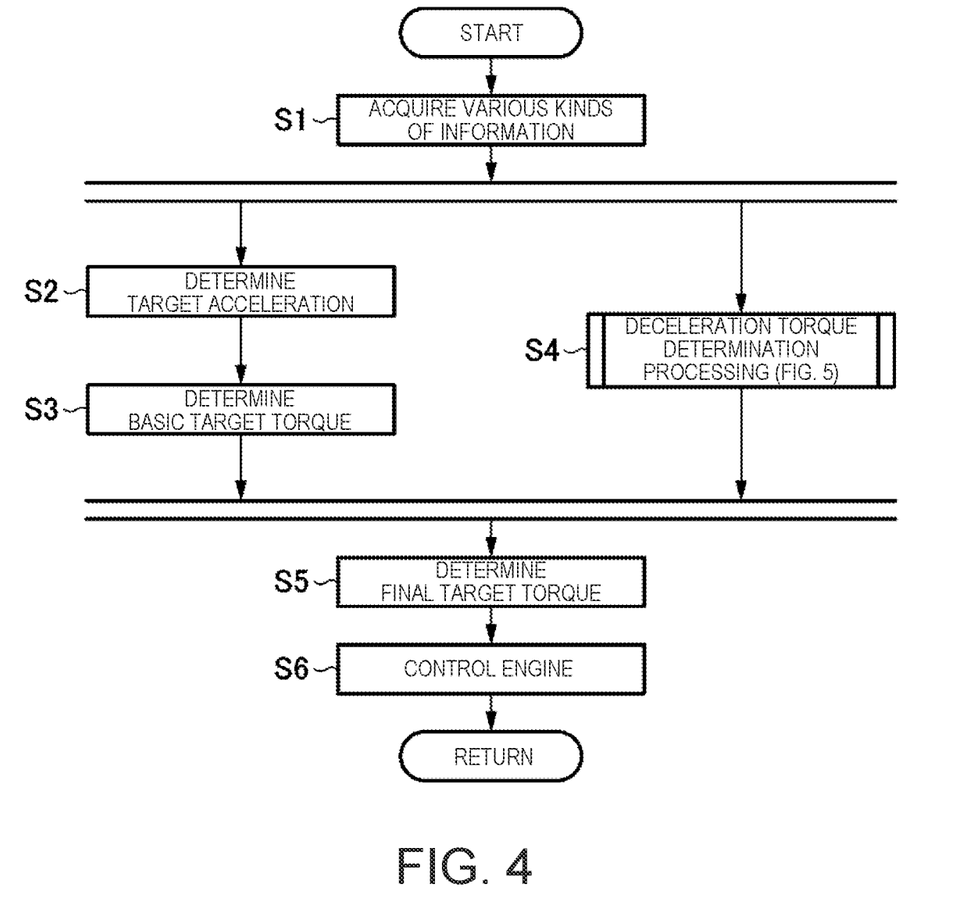
FIG. 4 is a flowchart of motor control processing in which the vehicle driving system according to the embodiment of the present invention controls a rotating electric machine.
Figure 5:
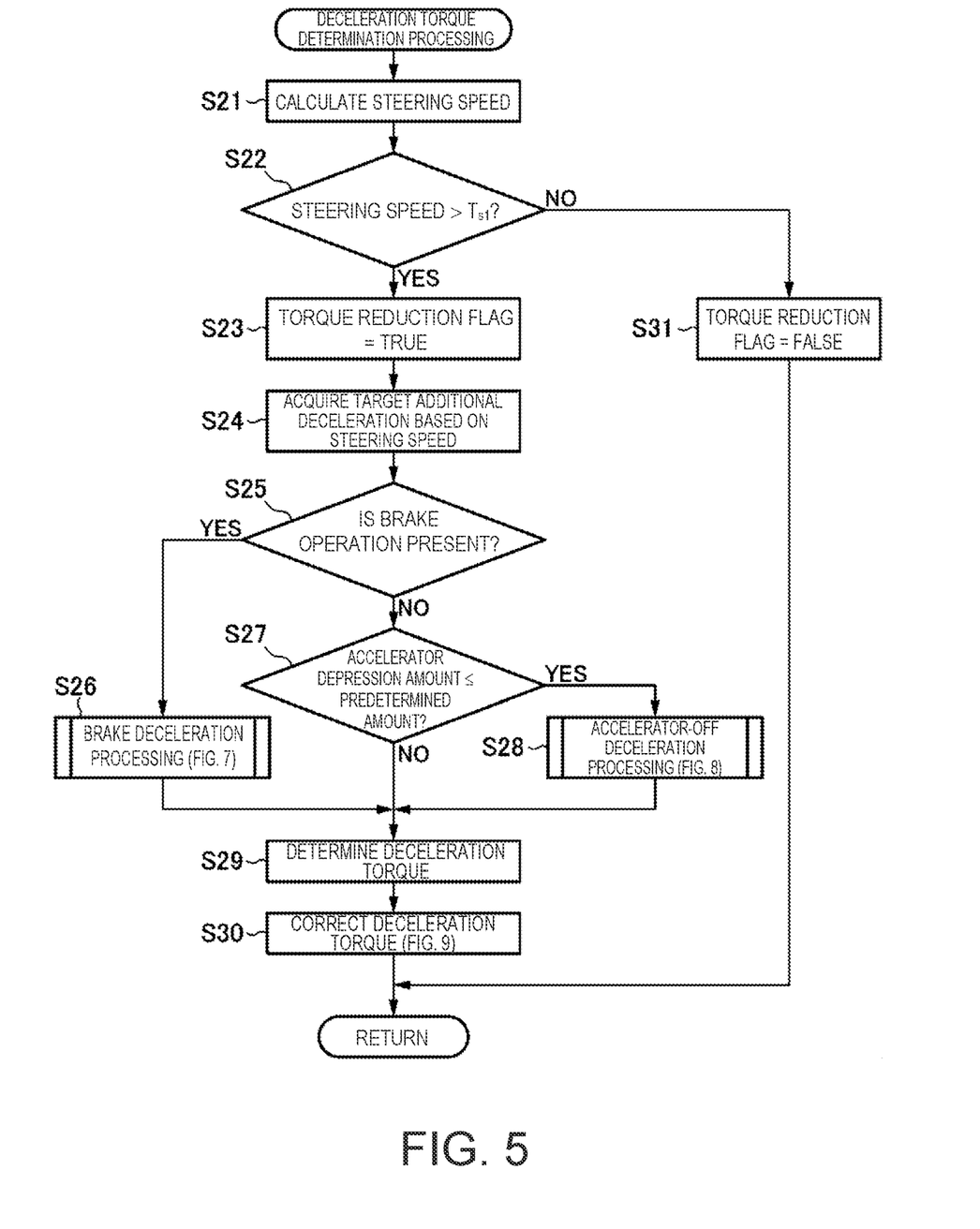
FIG. 5 is a flowchart of deceleration torque determination processing in which the vehicle driving system according to the embodiment of the present invention determines deceleration torque.
Figure 6:
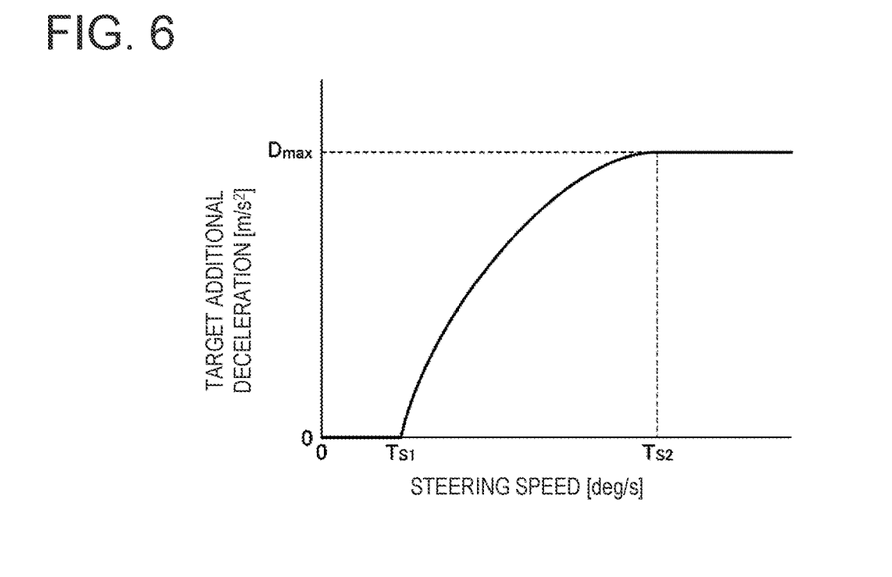
FIG. 6 is a map illustrating a relationship between target additional deceleration determined by the vehicle driving system according to the embodiment of the present invention and a steering speed.

FIG. 4 is a flowchart of motor control processing in which the vehicle driving system according to the embodiment of the present invention controls the rotating electric machine 6, FIG. 5 is a flowchart of deceleration torque determination processing in which the vehicle driving system according to the embodiment of the present invention determines deceleration torque, and FIG. 6 is a map illustrating a relationship between target additional deceleration determined by the vehicle driving system according to the embodiment of the present invention and a steering speed.

The PCM 22 executes the motor control processing of FIG. 4 to set deceleration torque based on a steering speed detected by the steering angle sensor 12 and executes the vehicle attitude control for controlling the rotating electric machine 6 such that this deceleration torque is applied to the drive wheels 4 (front wheels) of the vehicle 1. The motor control processing of FIG. 4 is initiated when an ignition of the vehicle 1 is turned on and the vehicle driving system is powered on, and is executed repeatedly.

When the motor control processing is started, as illustrated in FIG. 4, in step S1, the PCM 22 acquires various kinds of information on an operational state of the vehicle 1. Specifically, the PCM 22 acquires, as the information on the operational state, the detection signals output by the various sensors described above including a steering angle detected by the steering angle sensor 12, an accelerator opening detected by the accelerator opening sensor 18, a vehicle speed detected by the vehicle speed sensor 20, and the like.

Next, in step S2, the basic target torque determination unit 24 of the PCM 22 sets the target acceleration based on the operational state of the vehicle 1 including the operation of the accelerator pedal acquired in step S1. Specifically, the basic target torque determination unit 24 selects, from among acceleration characteristic maps (created in advance and stored in a memory or the like) defining various vehicle speeds, an acceleration characteristic map corresponding to the current vehicle speed and refers to the selected acceleration characteristic map to determine the target acceleration corresponding to the current accelerator opening.

Next, in step S3, the basic target torque determination unit 24 determines the basic target torque of the rotating electric machine 6 for realizing the target acceleration determined in step S2. In this case, the basic target torque determination unit 24 determines the basic target torque within a range of torque which can be output by the rotating electric machine 6, based on the current vehicle speed, road surface slope, road surface μ, and the like.

Furthermore, in parallel with the processing of steps S2 and S3, in step S4, the deceleration torque determination unit 26 executes the deceleration torque determination processing for determining the deceleration torque for adding deceleration to the vehicle 1 based on an operation of the steering wheel 10a. This deceleration torque determination processing will be described with reference to FIG. 5.

As illustrated in FIG. 5, when the deceleration torque determination processing is started, in step S21, the deceleration torque determination unit 26 calculates the steering speed based on the steering angle acquired in step S1.

Next, in step S22, the deceleration torque determination unit 26 determines whether the steering speed is larger than a predetermined threshold $T_{S1}$.

As a result, when the steering speed is larger than the threshold $T_{S1}$, proceeding to step S23, the deceleration torque determination unit 26 sets a torque reduction flag indicating whether a condition for reducing output torque of the rotating electric machine 6 for adding deceleration to the vehicle 1 is satisfied, to True (true value) indicating a state where the condition for reducing the torque is satisfied. On the other hand, when the steering speed is equal to or less than the threshold $T_{S1}$, proceeding to step S31, the torque reduction flag is set to False (false value) indicating a state where the condition for reducing the torque is not satisfied, and one processing of the flowchart illustrated in FIG. 5 ends.

Next, in step S24, the deceleration torque determination unit 26 acquires the target additional deceleration based on the steering speed. This target additional deceleration is a deceleration to be added to the vehicle 1 according to a steering operation in order to accurately realize a vehicle behavior in line with the driver's intention.

Specifically, the deceleration torque determination unit 26 acquires the target additional deceleration corresponding to the steering speed calculated in step S21, based on the relationship between the target additional deceleration and the steering speed which is illustrated in the map of FIG. 6.

In FIG. 6, the horizontal axis indicates the steering speed and the vertical axis indicates the target additional deceleration. As illustrated in FIG. 6, when the steering speed is equal to or less than the threshold $T_{S1}$, the corresponding target additional deceleration is 0. That is, when the steering speed is equal to or less than the threshold $T_{S1}$, the PCM 22 stops control for adding deceleration to the vehicle 1 based on the steering operation (specifically, reduction of output torque of the rotating electric machine 6).

On the other hand, when the steering speed exceeds the threshold $T_{S1}$, the target additional deceleration corresponding to this steering speed gradually approximates a predetermined upper limit value $D_{max}$ along with the increase in the steering speed. That is, as the steering speed increases, the target additional deceleration increases and an increase rate of its increase amount decreases. This upper limit value $D_{max}$ is set to a deceleration at which the driver does not feel control intervention even when the deceleration is added to the vehicle 1 according to the steering operation (for example, 0.5 m/s² ≈ 0.05 G).

Furthermore, when the steering speed is equal to or more than a threshold $T_{S2}$ which is larger than the threshold $T_{S1}$, the target additional deceleration is maintained at the upper limit value $D_{max}$.

Next, in step S25, it is determined whether the brake pedal (not illustrated) is depressed. When the brake pedal is depressed, the processing proceeds to step S26, and when the brake pedal is not depressed, it proceeds to step S27.

Figure 7:
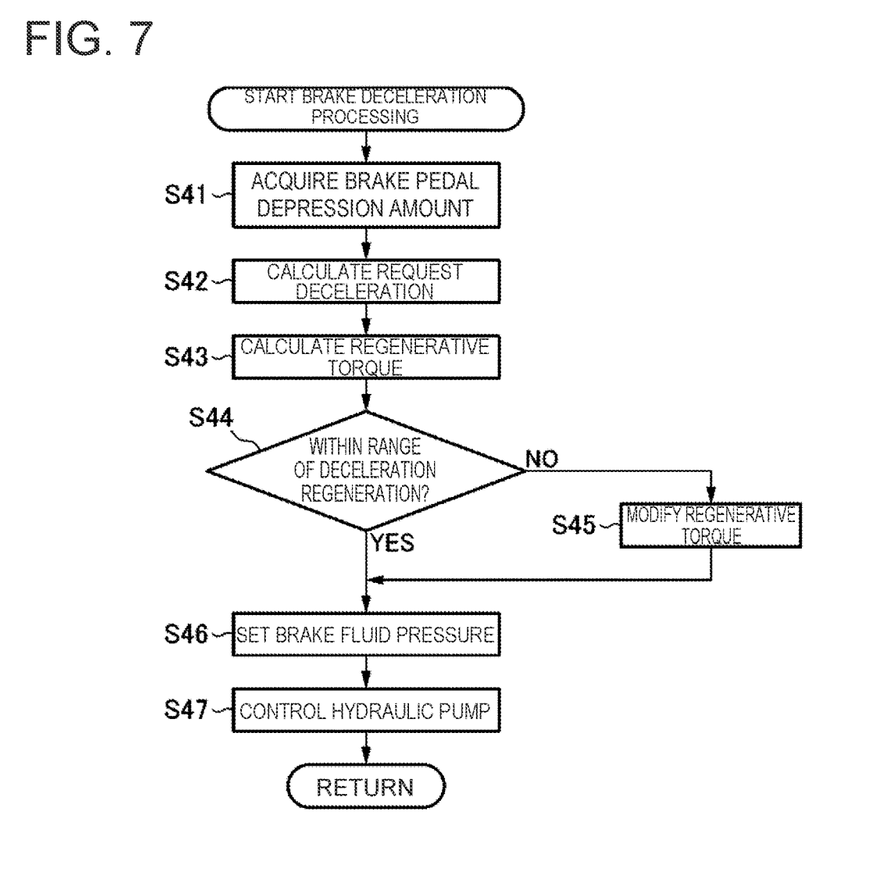
FIG. 7 is a flowchart illustrating brake deceleration processing in the vehicle driving system according to the embodiment of the present invention.

In step S26, brake deceleration processing illustrated in FIG. 7 is executed as a subroutine. In this brake deceleration processing, a requested deceleration requested through the driver operating the brake pedal (not illustrated) is set. Furthermore, this requested deceleration is realized mainly by the friction braking force generated by activation of the brake actuators 14. Details of the brake deceleration processing illustrated in FIG. 7 will be described later.

Figure 8:
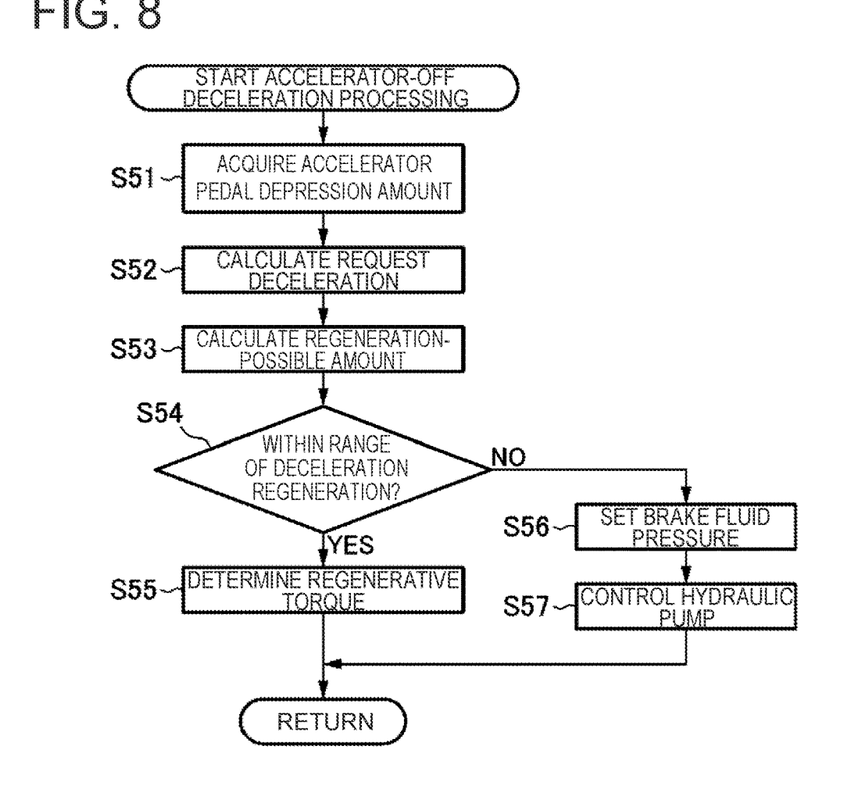
FIG. 8 is a flowchart illustrating accelerator-off deceleration processing in the vehicle driving system according to the embodiment of the present invention.

On the other hand, when the brake pedal is not depressed, proceeding to step S27, it is determined in step S27 whether the depression amount of the accelerator pedal (not illustrated) is equal to or less than a predetermined amount. When the depression amount of the accelerator pedal is equal to or less than the predetermined amount, the processing proceeds to step S28, and accelerator-off deceleration processing illustrated in FIG. 8 is executed as a subroutine. That is, in the present embodiment, when the depression amount of the accelerator pedal is equal to or less than the predetermined amount, it is configured such that as the depression amount is smaller, a larger braking force is applied to the vehicle 1. This braking force is given to the vehicle 1 mainly by the rotating electric machine 6 generating the regenerative torque. Details of the accelerator-off deceleration processing illustrated in FIG. 8 will be described later.

Once the processing of step S26, S27, or S28 ends, it proceeds to step S29. In step S29, the deceleration torque for realizing the target additional deceleration acquired in step S24 is first calculated. That is, in step S24, the target additional deceleration necessary for the vehicle attitude control is set based on the steering speed. Furthermore, the deceleration torque determination unit 26 of the PCM 22 determines the deceleration torque necessary for realizing the target additional deceleration, based on the current vehicle speed, road surface slope, and the like which are acquired in step S1 (FIG. 4).

The deceleration torque necessary for realizing this target additional deceleration is covered by the regenerative torque generated by the rotating electric machine 6. As described with reference to FIG. 3, the regenerative torque which can be generated by the rotating electric machine 6 changes according to electric power corresponding to the regeneration amount which can be received by the battery 2. However, the deceleration torque necessary for the vehicle attitude control is relatively small, and as illustrated in FIG. 3, in the region where the electric storage amount of the battery 2 is equal to or less than 70%, the regeneration amount equal to or more than the predetermined amount is always secured for the vehicle attitude control. Accordingly, in most cases, the deceleration torque necessary for the vehicle attitude control can be generated by the regenerative torque. Furthermore, when the deceleration torque necessary for the vehicle attitude control cannot be secured by the regenerative torque, the deceleration torque is reduced to suppress the effect of the vehicle attitude control.

On the other hand, during the vehicle attitude control, while the deceleration torque necessary for the vehicle attitude control is applied to the vehicle 1, the braking force (step S26) based on the operation of the brake pedal (not illustrated) by the driver or the braking force (step S28) based on the fact that the depression amount of the accelerator pedal (not illustrated) by the driver is small is also applied. These braking forces set based on the processing of steps S26 and S28 also include, other than the regenerative torque generated by the rotating electric machine 6, the friction braking force generated by activation of the brake actuators 14. Here, in the present embodiment, the regenerative torque generated by the rotating electric machine 6 is applied to the front wheels serving as the drive wheels 4, while the friction braking force based on activation of the brake actuators 14 is given to the front wheels and the rear wheels. Furthermore, it has been revealed by studies conducted by the inventor of the present invention that when, while being overlapped with the deceleration torque applied to the drive wheels 4 based on the vehicle attitude control, the friction braking force is applied to the front and rear wheels by activation of the brake actuators 14, the effect of the vehicle attitude control based on the deceleration torque is reduced.

Figure 9:
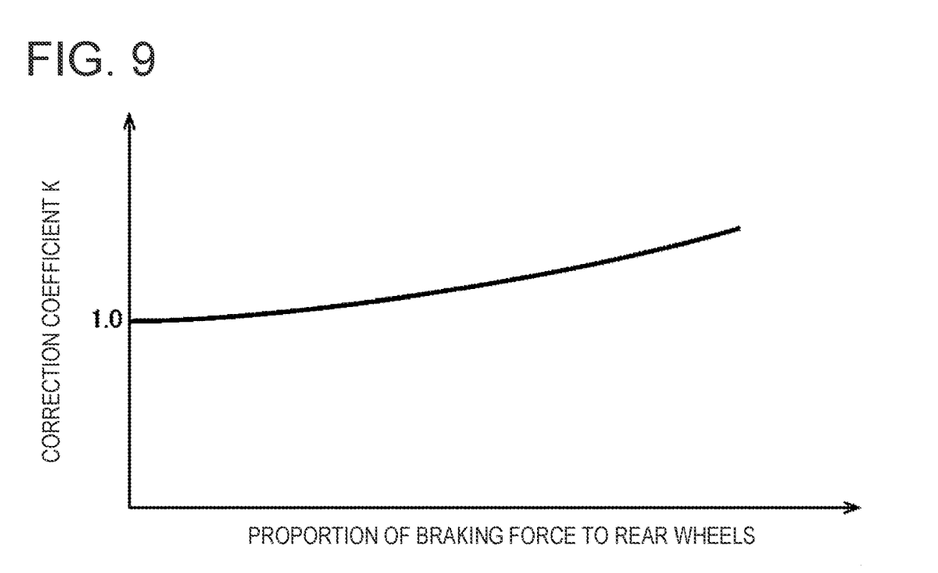
FIG. 9 is a map for setting a value of a correction coefficient to be multiplied by the deceleration torque, in the vehicle driving system according to the embodiment of the present invention.

Thus, in step S30, the deceleration torque calculated based on the target additional deceleration is corrected by using a correction coefficient illustrated in FIG. 9. That is, in the present embodiment, the deceleration torque to be given based on the vehicle attitude control is corrected based on a proportion of the friction braking force included in the braking force applied to the vehicle 1.

FIG. 9 is a map for setting a value of a correction coefficient K to be multiplied by the deceleration torque. In the map illustrated in FIG. 9, the horizontal axis indicates a proportion of the braking force applied to the rear wheels, and the vertical axis indicates the value of the correction coefficient K to be set. During the vehicle attitude control, when the brake actuators 14 are not activated, no braking force is applied to the rear wheels and the proportion of the braking force for the rear wheels is zero. In this case, the correction coefficient K=1, and as the vehicle attitude control, the deceleration torque calculated in step S29 is given as it is.

On the other hand, during the vehicle attitude control, when the brake actuators 14 are activated, the friction braking force is also given to the rear wheels, and the proportion of the braking force for the rear wheels becomes larger than zero. When the friction braking force is applied to each of the wheels (the front wheels and the rear wheels) by the brake actuators 14, this friction braking force is detected by the brake fluid pressure sensor 16. Then, as illustrated in FIG. 9, as the friction braking force becomes larger and the proportion of the braking force given to the rear wheels becomes larger, the correction coefficient K becomes larger, and the deceleration torque is corrected to a larger value. Thus, when the friction braking force is applied to each of the wheels during execution of the vehicle attitude control, if the friction braking force is large, the deceleration torque determination unit 26 of the PCM 22 corrects the deceleration torque to a larger value than when the friction braking force is small.

After step S30, the deceleration torque determination unit 26 ends the deceleration torque determination processing and returns to the main routine illustrated in FIG. 4.

In the flowchart illustrated in FIG. 4, after the processing of steps S2 and S3 and the deceleration torque determination processing of step S4 are performed, in step S5, the final target torque determination unit 28 subtracts the deceleration torque determined in the deceleration torque determination processing of step S4 from the basic target torque determined in step S3 to thereby determine the final target torque.

Next, in step S6, the motor controller 30 controls the rotating electric machine 6 such that the final target torque set in step S5 is output. Specifically, the motor controller 30 controls the inverter 8 such that the final target torque set in step S5 is produced, to execute supply of electric power from the battery 2 to the rotating electric machine 6 or collection of regenerative electric power from the rotating electric machine 6 to the battery 2.

In this case, the motor controller 30 controls the inverter 8 so as to keep a restriction range of the electric power supplied from the battery 2 to the rotating electric machine 6 or a restriction range (FIG. 3) of the regeneration amount of the electric power from the rotating electric machine 6 to the battery 2.

After step S6, the PCM 22 ends one processing of the flowchart illustrated in FIG. 4.

Next, the brake deceleration processing will be described with reference to FIG. 7.

FIG. 7 is a flowchart illustrating the brake deceleration processing, and this brake deceleration processing is executed when called from step S26 of the flowchart of FIG. 5 during execution of the vehicle attitude control and when the brake pedal (not illustrated) is operated during non-execution of the vehicle attitude control.

First, in step S41 of FIG. 7, the depression amount of the brake pedal (not illustrated) is acquired. Specifically, the depression amount of the brake pedal is detected by a position sensor (not illustrated) provided on the brake pedal, and the detected depression amount is input to the PCM 22.

Next, in step S42, the requested deceleration based on the operation of the brake pedal is calculated based on the detected depression amount.

Furthermore, in step S43, the regenerative torque for producing a part of the requested deceleration calculated in step S42 is calculated. That is, in the present embodiment, a predetermined proportion of the deceleration requested based on the operation of the brake pedal is covered by the regenerative torque generated by the rotating electric machine 6. Accordingly, during execution and non-execution of the vehicle attitude control, when the brake pedal (not illustrated) is operated, the friction braking force is applied to each of the wheels by activating the brake actuators 14. Furthermore, when the operation amount of the brake pedal is large, a larger regenerative torque than when the operation amount is small is generated by the rotating electric machine 6.

Next, in step S44, it is determined whether the regenerative torque set in step S43 is within a range of the regeneration-possible amount of the battery 2. That is, the electric power which can be regenerated by the rotating electric machine 6 changes according to the electric storage amount of the battery 2. In step S44, it is determined whether the regenerative torque set in step S43 can be produced by the regeneration amount within a range of the deceleration regeneration indicated by hatching in FIG. 3.

When the regenerative torque set in step S43 cannot be produced within the range of the deceleration regeneration of the battery 2, the processing proceeds to step S45. In step S45, the regenerative torque is modified to a value corresponding to the upper limit value of the region of the deceleration regeneration of the battery 2. As illustrated in FIG. 3, the region of the deceleration regeneration of the regeneration amount is set so as to be always smaller than the upper limit value of the regeneration amount indicated by the thick line in FIG. 3. That is, the electric power regeneration executed based on the operation of the brake pedal is set so as to be always smaller than the upper limit value of the regeneration amount which can be received by the battery 2, and there is capacity for further regenerating electric power in the battery 2. A difference between the upper limit value of this regeneration amount and the region of the deceleration regeneration is preserved for generating the deceleration torque necessary for the vehicle attitude control described above.

Next, in step S46, brake fluid pressure for generating a necessary friction braking force is set. As described above, the requested deceleration set based on the operation of the brake pedal by the driver is realized by the braking force from the regenerative torque generated by the rotating electric machine 6 and the friction braking force generated by activating the brake actuators 14. In step S46, a braking force is calculated in which the braking force from the regenerative torque calculated in step S43 or the regenerative torque modified in step S45 is subtracted from the braking force necessary for realizing the requested deceleration, and the brake fluid pressure necessary for generating this braking force is calculated.

Next, in step S47, the PCM 22 sends a control signal to a hydraulic pump (not illustrated) such that the friction braking force calculated in step S46 is produced, and ends one processing of the flowchart illustrated in FIG. 7. Thus, while the braking force from the regenerative torque of the rotating electric machine 6 and the friction braking force from the brake actuators 14 are produced based on the brake pedal operation of the driver, the requested deceleration is realized mainly by the friction braking force.

Next, the accelerator-off deceleration processing will be described with reference to FIG. 8.

FIG. 8 is a flowchart illustrating the accelerator-off deceleration processing, and this accelerator-off deceleration processing is executed when called from step S28 of the flowchart of FIG. 5 during execution of the vehicle attitude control and when the depression amount of the accelerator pedal (not illustrated) is made equal to or less than the predetermined value during non-execution of the vehicle attitude control.

First, in step S51 of FIG. 8, the depression amount of the accelerator pedal (not illustrated) is acquired. Specifically, the depression amount of the accelerator pedal is detected by the accelerator opening sensor 18 (not illustrated) provided on the accelerator pedal, and the detected depression amount is input to the PCM 22.

Next, in step S52, the requested deceleration based on the fact that the depression amount of the accelerator pedal is small is calculated based on the detected depression amount. As described above, in the present embodiment, when the depression amount of the accelerator pedal exceeds the predetermined value, the driving force is produced by the rotating electric machine 6, and when the depression amount is equal to or less than the predetermined value (accelerator-off), the regenerative torque is generated by the rotating electric machine 6 to decelerate the vehicle 1. When the depression amount of the accelerator pedal is equal to or less than the predetermined value, as the depression amount is smaller, a larger requested deceleration is set.

Furthermore, in step S53, the regeneration-possible amount of electric power in the battery 2 is calculated. As illustrated in FIG. 3, the regeneration-possible amount of electric power in the battery 2 changes according to the electric storage amount. In step S53, the upper limit value in the region of the deceleration regeneration of FIG. 3 is calculated as the regeneration-possible amount. That is, also in the deceleration based on the fact that the depression amount of the accelerator pedal is small, the regeneration amount to be used in the vehicle attitude control is preserved without execution of regeneration up to the upper limit value of the regeneration amount which can be received by the battery 2.

Next, in step S54, it is determined whether the requested deceleration calculated in step S52 can be realized within a range of the regenerative torque corresponding to the regeneration-possible amount calculated in step S53. That is, it is determined whether the requested deceleration calculated in step S52 can be realized by the regenerative torque within the range of the deceleration regeneration in FIG. 3, and when realizable, the processing proceeds to step S55.

In step S55, the regenerative torque for realizing the requested deceleration calculated in step S52 is determined, and one processing of the flowchart of FIG. 8 ends.

On the other hand, when the requested deceleration calculated in step S52 cannot be realized by the regenerative torque within the range of the deceleration regeneration in FIG. 3, the processing proceeds to step S56. In step S56, an insufficient braking force of the regenerative torque is calculated, and brake fluid pressure necessary for this braking force to be generated by the friction braking force is set.

Next, in step S57, the PCM 22 sends a control signal to the hydraulic pump (not illustrated) such that the brake fluid pressure set in step S56 is realized, and ends one processing of the flowchart illustrated in FIG. 8. Thus, when the depression amount of the accelerator pedal is small, the braking force from the regenerative torque of the rotating electric machine 6 is produced within the region of the deceleration regeneration in FIG. 3. Furthermore, when the regenerative torque is insufficient, the brake actuators 14 are activated, and the insufficiency is complemented by the friction braking force. Thus, in the present embodiment, during execution and non-execution of the vehicle attitude control, when a necessary braking force is not obtained only by the regenerative torque from the rotating electric machine 6, even if there is no brake operation by the driver, the brake actuators 14 are activated, and the friction braking force is applied to the vehicle 1.

Figure 10:
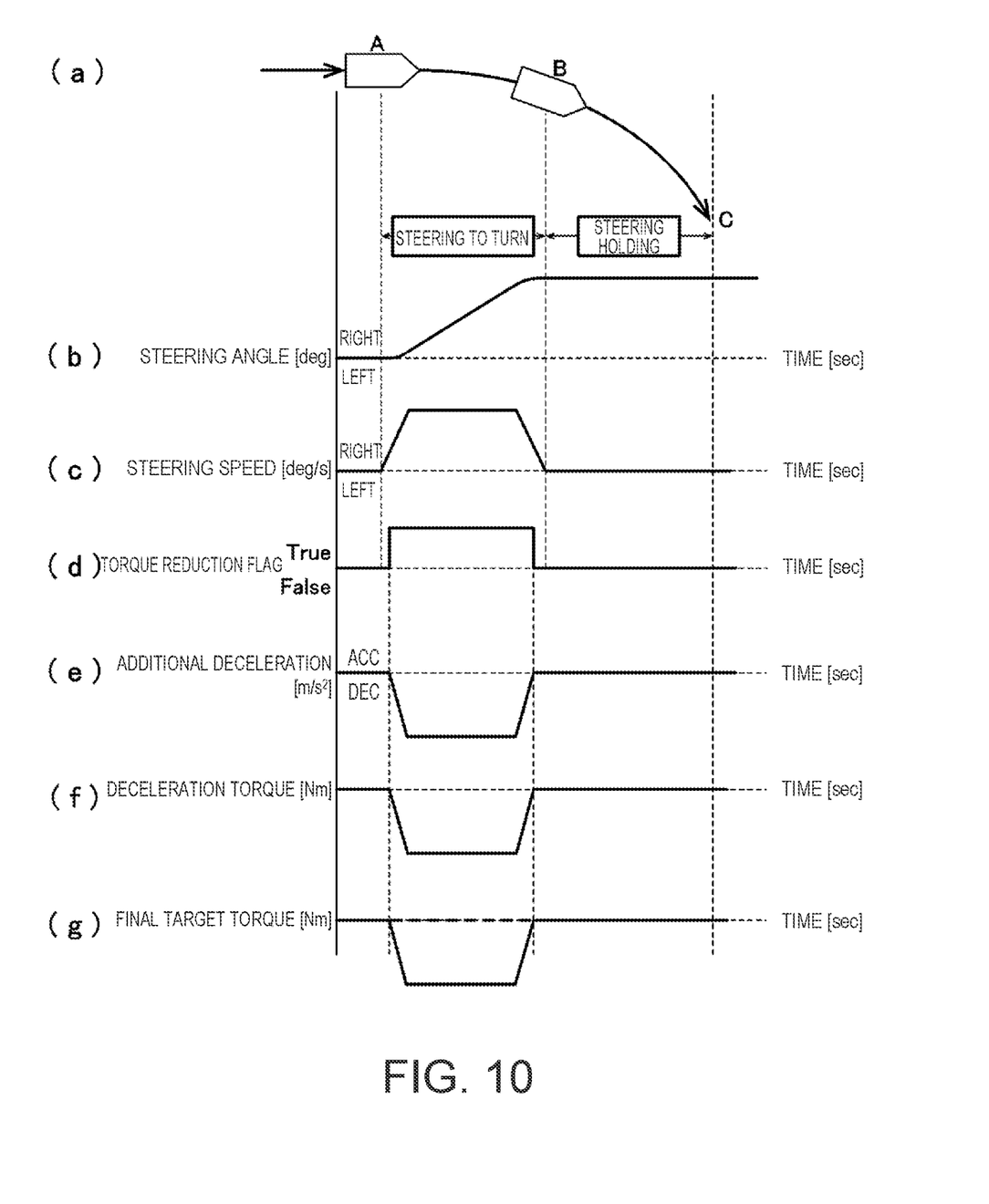
FIG. 10 is a time chart illustrating temporal changes in parameters relating to control of the rotating electric machine in the case where the vehicle equipped with the vehicle driving system according to the embodiment of the present invention turns.

Next, an example of the vehicle attitude control by means of the vehicle driving system according to the embodiment of the present invention will be described with reference to FIG. 10. FIG. 10 is a time chart illustrating temporal changes in parameters relating to control of the rotating electric machine 6 in the case where the vehicle 1 equipped with the vehicle driving system according to the embodiment of the present invention turns.

FIG. 10(*a*) is a plan view schematically illustrating the vehicle 1 turning right. As illustrated in FIG. 10(*a*), the vehicle 1 starts to turn right from a position A and continues to turn right with the steering angle kept constant from a position B to a position C. Furthermore, in the example illustrated in FIG. 10, during traveling of the vehicle 1, the brake pedal (not illustrated) is not operated, and the depression amount of the accelerator pedal (not illustrated) is made larger than the predetermined value.

FIG. 10(*b*) is a diagram illustrating a change in the steering angle of the vehicle 1 turning right as illustrated in FIG. 10(*a*). In FIG. 10(*b*), the horizontal axis indicates time and the vertical axis indicates the steering angle.

As illustrated in FIG. 10(*b*), the rightward steering is started at the position A, and the rightward steering angle gradually increases as an additional steering operation is performed, so that the rightward steering angle becomes a maximum at the position B. Thereafter, the steering angle is kept constant up to the position C (steering holding).

FIG. 10(*c*) is a diagram illustrating a change in the steering angle of the vehicle 1 turning right as illustrated in FIG. 10(*b*). In FIG. 10(*b*), the horizontal axis indicates time and the vertical axis indicates the steering speed.

The steering speed of the vehicle 1 is represented by a time differentiation of the steering angle of the vehicle 1. That is, as illustrated in FIG. 10(*c*), when the rightward steering is started at the position A, the rightward steering speed occurs, and the steering speed between the position A and the position B is kept substantially constant. Thereafter, the rightward steering speed decreases, and when the rightward steering angle becomes a maximum at the position B, the steering speed becomes zero. Furthermore, while the rightward steering angle is held from the position B to the position C, the steering speed remains zero.

FIG. 10(d) is a diagram illustrating a true-false value of the torque reduction flag set based on the steering speed. In FIG. 10(d), the horizontal axis indicates time and the vertical axis indicates the true-false value of the torque reduction flag (steps S23 and S31 of FIG. 5).

As illustrated in FIG. 10(d), before the rightward steering is started at the position A, the torque reduction flag is set to False. Then, after the rightward steering is started at the position A, when the steering speed exceeds the threshold $T_{S1}$, the torque reduction flag changes from False to True. Thereafter, the steering speed decreases along with the approach to the position B, and when the steering speed becomes equal to or less than the threshold $T_{S1}$, the torque reduction flag changes from True to False.

FIG. 10(e) is a diagram illustrating a change in the additional deceleration determined based on the steering speed and the torque reduction flag. In FIG. 10(e), the horizontal axis indicates time and the vertical axis indicates the additional deceleration.

As described with reference to FIG. 6, when the steering speed is larger than the threshold $T_{S1}$ in step S22 of FIG. 5 (that is, when the torque reduction flag is True), the deceleration torque determination unit 26 acquires the target additional deceleration based on the steering speed in step S24. Subsequently, in the example illustrated in FIG. 10, the brake pedal (not illustrated) is not operated, and the depression amount of the accelerator pedal is larger than the predetermined value; accordingly, after step S24, the process proceeds in the order of steps S25, S27, and S29, and the deceleration torque is determined. Furthermore, no friction braking force is applied during traveling, and thus correction of the deceleration torque in step S30 is not executed (correction coefficient K=1).

As illustrated in FIG. 10(e), the additional deceleration starts to increase from when the torque reduction flag is switched from False to True, and is kept substantially constant between the position A and the position B, and thereafter the additional deceleration decreases according to the decrease in the steering speed and then becomes zero when the torque reduction flag is switched from True to False.

FIG. 10(f) is a diagram illustrating a change in the deceleration torque determined based on the additional deceleration illustrated in FIG. 10(e). In FIG. 10(f), the horizontal axis indicates time and the vertical axis indicates the deceleration torque.

As described above, the deceleration torque determination unit 26 determines the deceleration torque necessary for realizing the additional deceleration, based on parameters such as the current vehicle speed and road surface slope. Furthermore, when the friction braking force is applied by, during execution of the vehicle attitude control (while the torque reduction flag is True), operating the brake actuators 14 or making the depression amount of the brake pedal (not illustrated) equal to or less than the predetermined value, the deceleration torque is corrected to a larger value based on FIG. 9. Accordingly, when the above parameters are constant and no friction braking force is applied, the deceleration torque is determined so as to change similarly to the change in the additional deceleration illustrated in FIG. 10(e).

FIG. 10(g) is a diagram illustrating a change in the final target torque determined based on the basic target torque and the deceleration torque. In FIG. 10(g), the horizontal axis indicates time and the vertical axis indicates the torque. Furthermore, in FIG. 10(g), the broken line indicates the basic target torque and the solid line indicates the final target torque.

As described with reference to FIG. 4, the final target torque determination unit 28 subtracts the deceleration torque determined in the deceleration torque determination processing of step S4 from the basic target torque determined in step S3 to thereby determine the final target torque.

That is, as illustrated in FIG. 10(g), while the torque reduction flag is set to True between the position A and the position B, the final target torque is reduced from the basic target torque by the deceleration torque, and the deceleration according to the torque reduction occurs in the vehicle 1, so that a load shift to the front wheels serving as the drive wheels 4 occurs. As a result, the friction force between the drive wheels 4 and the road surface increases and the cornering force of the drive wheels 4 increases, so that the turn-in ability of the vehicle 1 is enhanced.

Furthermore, according to the vehicle driving system of the embodiment of the present invention, when the friction braking force is applied to each of the wheels by the brake actuators 14 during execution of the vehicle attitude control, if the friction braking force detected by the brake fluid pressure sensor 16 is large, the deceleration torque is corrected to a larger value than when this friction braking force is small (step S30 of FIG. 5). Thus, it is possible to suppress the occurrence of a difference in effect of the vehicle attitude control depending on the degree to which the friction braking force is given, so that the driver can be prevented from feeling uncomfortable.

Furthermore, according to the vehicle driving system of the present embodiment, when the vehicle attitude control is not executed, the electric power regeneration is executed within the range of the regeneration amount less than the upper limit value (the thick line in FIG. 3) of the regeneration amount which can be received by the battery 2 (the region of the deceleration regeneration in FIG. 3). Accordingly, at the time of execution of the vehicle attitude control, there is always room for performing the electric power regeneration in the battery 2, and thus the torque generated by the regeneration can be effectively used as the deceleration torque in the vehicle attitude control.

Furthermore, according to the vehicle driving system of the present embodiment, when a necessary braking force is not obtained only by the regenerative torque (from steps S54 to S56 of FIG. 8), the PCM 22 activates the brake actuators 14 to apply the friction braking force to the vehicle 1. Accordingly, even when the regenerative torque is not obtained sufficiently, the necessary braking force can be obtained reliably.

Furthermore, according to the vehicle driving system of the present embodiment, when the depression amount of the accelerator pedal (not illustrated) is equal to or less than the predetermined amount, even if the brake pedal (not illustrated) of the vehicle 1 is not operated (from steps S25 to S27 of FIG. 5), the PCM 22 applies the braking force to the vehicle 1 (from steps S27 to S28 of FIG. 5). Thus, a braking force similar to an engine brake in an engine vehicle can be applied to the vehicle 1 driven by the rotating electric machine 6. Furthermore, when a necessary braking force is not obtained only by the electric power regeneration, even if the brake pedal is not operated, the PCM 22 activates the brake actuators 14 (step S57 of FIG. 8) to apply the friction braking force to the vehicle 1, so that even when the regenerative torque is insufficient, the necessary braking force can be obtained reliably.

Furthermore, according to the vehicle driving system of the present embodiment, when the brake pedal (not illustrated) is operated during execution of the vehicle attitude control, the friction braking force is applied to each of the wheels, and when the operation amount of the brake pedal is large, a large regenerative torque is generated by the rotating electric machine 6. Accordingly, when a large friction braking force is applied to each of the wheels during the vehicle attitude control, the regenerative torque to be applied to the front wheels is also made larger (step S43 of FIG. 7), so that even in the situation where the large friction braking force is applied, a sufficient effect of the vehicle attitude control can be obtained.

Although the embodiment of the present invention has been described above, various changes can be added to the embodiment.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

REFERENCE CHARACTERS LIST

1 vehicle
2 battery
4 drive wheel
6 rotating electric machine
8 inverter
10 steering apparatus
10*a* steering wheel
12 steering angle sensor
14 brake actuator
16 brake fluid pressure sensor (friction braking force sensor)
18 accelerator opening sensor
20 vehicle speed sensor
22 PCM (controller)
24 basic target torque determination unit
26 deceleration torque determination unit
28 final target torque determination unit
30 motor controller

The invention claimed is:

1. A vehicle driving system having a vehicle attitude control function, the vehicle driving system comprising:
a rotating electric machine that drives a front wheel of a vehicle or applies a regenerative torque to the front wheel;
a battery that supplies electric power to the rotating electric machine and stores electric power regenerated by the rotating electric machine;
a steering apparatus for steering the vehicle;
a steering angle sensor for detecting a steering angle achieved by the steering apparatus;
a brake actuator configured to apply a friction braking force to each of wheels of the vehicle;
a friction braking force sensor that detects the friction braking force produced by the brake actuator; and
a controller configured to execute vehicle attitude control that sets a deceleration torque based on a steering speed detected by the steering angle sensor and controls the rotating electric machine such that the deceleration torque is applied to the front wheel of the vehicle, wherein
when the friction braking force is applied to each of the wheels by the brake actuator during execution of the vehicle attitude control, the controller corrects the deceleration torque by increasing the deceleration torque as the friction braking force detected by the friction braking force sensor increases,
when the friction braking force is not applied to each of the wheels by the brake actuator during execution of the vehicle attitude control, the controller does not perform the deceleration torque correction,
during non-execution of the vehicle attitude control, the controller executes electric power regeneration via the rotating electric machine within a range of a predetermined regeneration amount that is less than an upper limit value of a regeneration amount that is configured to be received by the battery,
the upper limit value of the regeneration amount is a substantially constant value when an electric storage amount of the battery is equal or less than a prescribed electric storage amount, and
the upper limit value of the regeneration amount decreases as the electric storage amount increases when the electric storage amount of the battery exceeds the prescribed electric storage amount.

2. The vehicle driving system according to claim 1, wherein during execution of the vehicle attitude control, when a necessary braking force is not obtained only by the regenerative torque from the rotating electric machine, the controller activates the brake actuator to apply the friction braking force to the vehicle.

3. The vehicle driving system according to claim 2, wherein when a depression amount of an accelerator pedal of the vehicle is equal to or less than a predetermined amount, the controller is configured to apply a braking force to the vehicle, and when a necessary braking force is not obtained only by the electric power regeneration, even when a brake pedal of the vehicle is not operated, the controller activates the brake actuator to apply the friction braking force to the vehicle.

4. The vehicle driving system according to claim 2, wherein when a brake pedal of the vehicle is operated during execution of the vehicle attitude control, the controller activates the brake actuator to apply the friction braking force to each of the wheels, and when an operation amount of the brake pedal increases, the controller causes the rotating electric machine to increase a regenerative torque.

5. The vehicle driving system according to claim 1, wherein during execution of the vehicle attitude control, when a necessary braking force is not obtained only by the regenerative torque from the rotating electric machine, the controller activates the brake actuator to apply the friction braking force to the vehicle.

6. The vehicle driving system according to claim 1, wherein when a brake pedal of the vehicle is operated during execution of the vehicle attitude control, the controller activates the brake actuator to apply the friction braking force to each of the wheels, and when an operation amount of the brake pedal increases, the controller causes the rotating electric machine to increase a regenerative torque.

7. The vehicle driving system according to claim 5, wherein when a depression amount of an accelerator pedal of the vehicle is equal to or less than a predetermined amount, the controller is configured to apply a braking force to the vehicle, and when a necessary braking force is not obtained only by the electric power regeneration, even if a brake pedal of the vehicle is not operated, the controller activates the brake actuator to apply the friction braking force to the vehicle.

8. The vehicle driving system according to claim 1, wherein the controller is further configured to:
   determine whether the regenerative torque set is within a range of a regeneration-possible amount of the battery,
   when the regenerative torque set cannot be produced within a range of deceleration regeneration of the battery, modify the regenerative torque to a value corresponding to the upper limit value of the range of the deceleration regeneration of the battery,
   calculate the friction braking force by subtracting a braking force from the regenerative torque or the modified regenerative torque from a braking force necessary for realizing a requested deceleration, and
   send a control signal to a hydraulic pump to apply hydraulic pressure to the brake actuator such that the friction braking force is generated.

9. The vehicle driving system according to claim 1, wherein the prescribed electric storage amount is about 30%.

10. The vehicle driving system according to claim 1, wherein the upper limit value of the regeneration amount decreases linearly as the electric storage amount increases when the electric storage amount of the battery exceeds the prescribed electric storage amount.

\* \* \* \* \*